Figure 1:
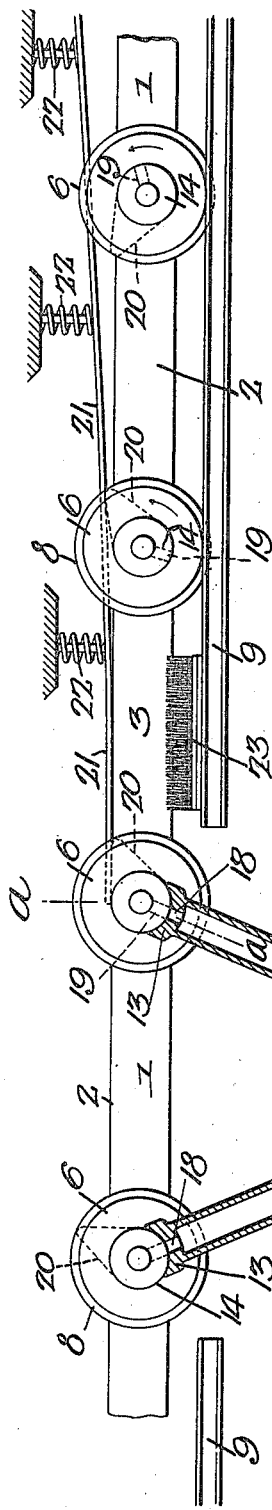

J. M. DODGE.
DEVICE FOR LUBRICATING CHAINS.
APPLICATION FILED MAY 13, 1915.

1,192,762.

Patented July 25, 1916.
3 SHEETS—SHEET 1.

Inventor.
James M. Dodge.
by his Attorneys
Howson & Howson

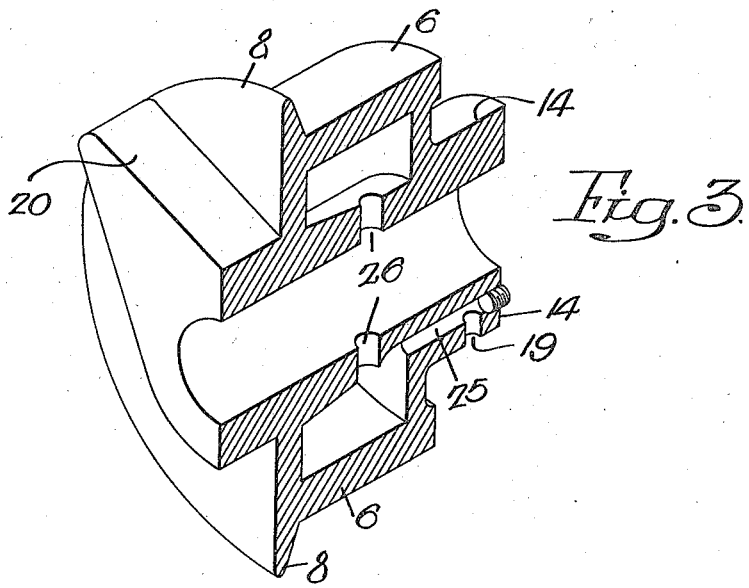
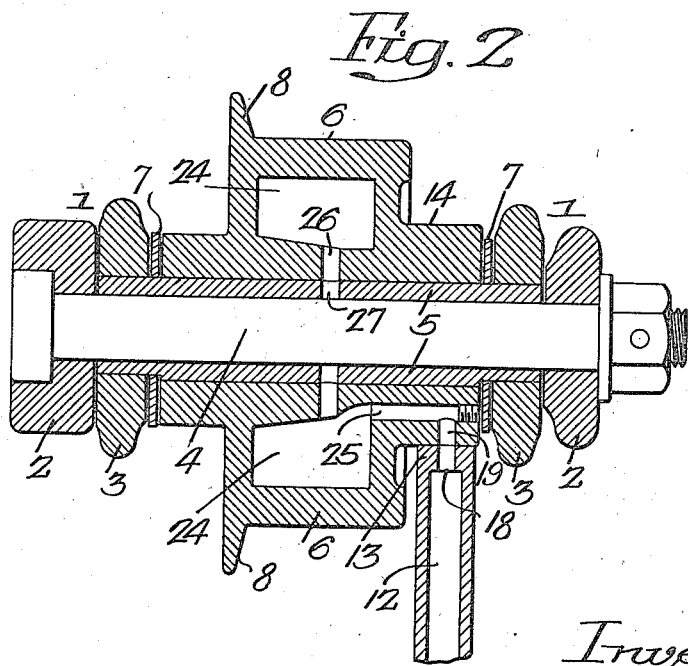

J. M. DODGE.
DEVICE FOR LUBRICATING CHAINS.
APPLICATION FILED MAY 13, 1915.
1,192,762.
Patented July 25, 1916.
3 SHEETS—SHEET 3.
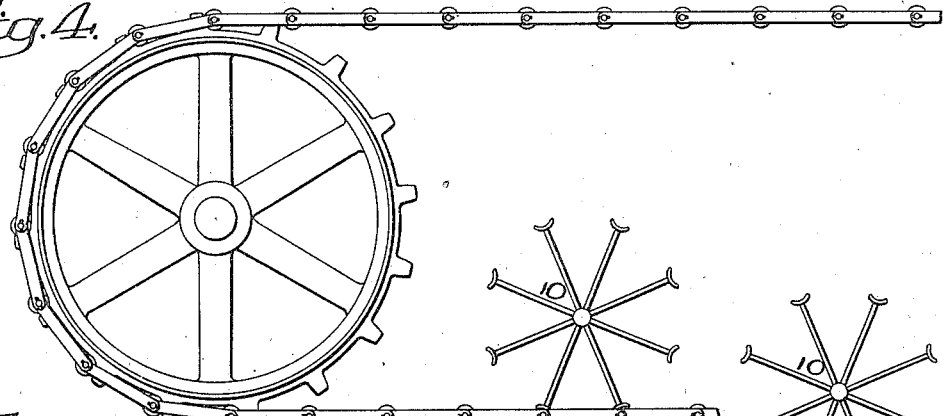
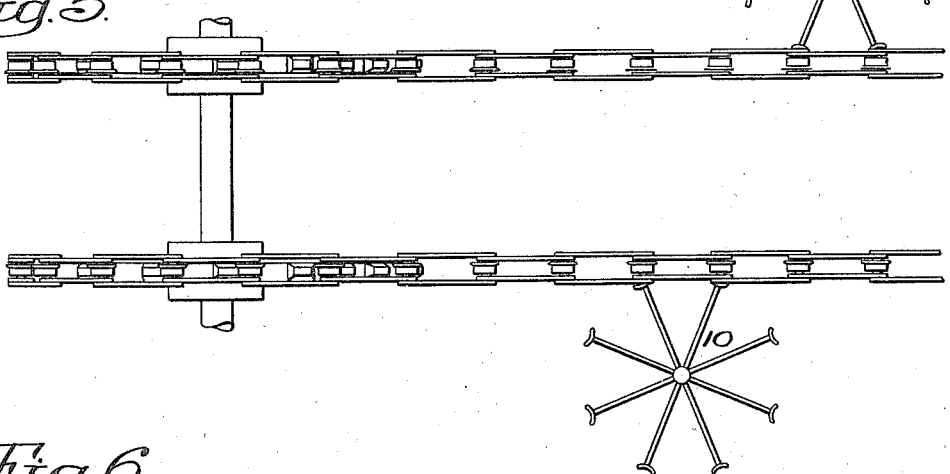
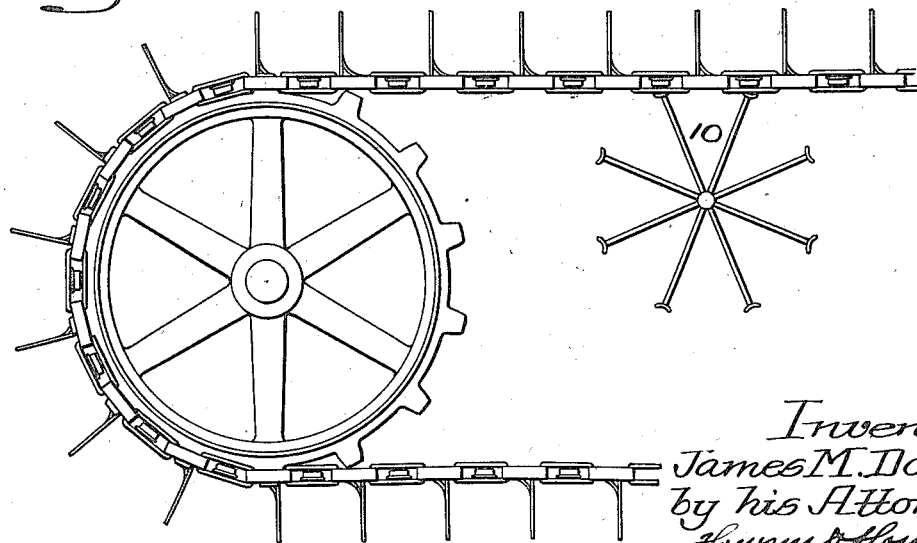
Inventor:—
James M. Dodge.
by his Attorneys
Howson & Howson

UNITED STATES PATENT OFFICE.

JAMES M. DODGE, OF PHILADELPHIA, PENNSYLVANIA, ASSIGNOR TO LINK-BELT COMPANY, OF CHICAGO, ILLINOIS, A CORPORATION OF ILLINOIS.

DEVICE FOR LUBRICATING CHAINS.

1,192,762.

Specification of Letters Patent. Patented July 25, 1916.

Application filed May 13, 1915. Serial No. 27,811.

*To all whom it may concern:*

Be it known that I, JAMES M. DODGE, a citizen of the United States, residing in Philadelphia, Pennsylvania, have invented certain Improvements in Devices for Lubricating Chains, of which the following is a specification.

One object of my invention is to provide means for automatically lubricating the rollers and pivot pins of a drive or conveyer chain.

A further object of the invention is to provide means whereby the lubricant can be forced into the bearings under pressure.

A still further object of the invention is to provide means for locating the passage in each wall so that it will aline properly with the device for charging it with the lubricant.

In the accompanying drawings:—Figure 1, is a longitudinal sectional view showing my improved lubricating device. Fig. 2, is an enlarged sectional view on the line *a—a*, Fig. 1; Fig. 3, is a sectional perspective view of one of the wheels; Fig. 4, is a sectional view showing the lubricating device located above the run of the chain, instead of below the run of the chain as in Fig. 1; Fig. 5, is a view showing the automatic lubricator on either side of a double chain; and Fig. 6, is a view showing the lubricator in connection with another type of chain conveyer.

Referring in the first instance to Figs. 1, 2 and 3, 1 is a conveyer chain of any suitable type, consisting of a series of links 2 and 3 pivotally connected by pins 4. The links 3 are connected by a sleeve 5 through which the pin 4 extends and mounted on this sleeve 5 is a wheel 6. A washer 7 is located between the hub of the wheel and the links 3. This is an ordinary type of conveyer chain using wheels or rollers.

The wheel, in the present instance, is flanged as at 8, and is adapted to a track 9 broken, as shown in Fig. 1, to allow the wheels to be carried solely by the lubricating device for a certain distance as described hereinafter. 10 is the lubricating device consisting of a hub 11, arms 12 and curved seats 13 which conform to the shape of the hub 14 of the wheel 6, as clearly shown in Fig. 1.

The lubricating device is mounted on a tubular shaft 15 having a slot at 16. In the hub is a series of passages 17 which communicate with the tubular arms 12, and in the seat 13 of each arm is a passage 18 which is arranged to communicate with the lubricant passage 19 in the hub 14 of the wheel. The slot 16 in the tubular shaft is of such a length that the lubricant is only admitted to the two upper arms 12 of the series, in the present instance, which are in direct contact with the wheel. The passages in the remaining arms are cut off from the supply of lubricant and, consequently, no lubricant will escape from these arms, as the hub 11 acts as a valve to cut off the supply except that passing through the slot 16.

In order to bring the holes 19 of the wheels 6 in proper position so as to be in alinement with the passages 18 in the seats 13, I provide a lug 20 on the side of each wheel, as illustrated in Fig. 3, and this lug comes in contact with a yielding plate 21 back of which are springs 22, in the present instance, which yieldingly press the plate forward so that when the lug strikes the plate as the wheel reaches it, it will hold the wheel from turning further until its hub is in one of the seats 13 and, while it is traveling from this portion to the seat, the surface of the hub surrounding the hole 19 is cleaned by a fixed brush 23, as shown clearly in Fig. 1.

As soon as the hub of the wheel is properly mounted on the seat, the wheel is under the control of the lubricating device, as the rail 21 is discontinued. The lubricating device will carry the wheel across the gap in the rail 9 and will deliver the wheel onto the opposite portion of the rail. In the meantime, sufficient lubricant has been forced under pressure into the body of the wheel to properly lubricate the wheel until it comes in contact with the lubricating device.

In the present instance, I form a reservoir 24 in the wheel, as illustrated in Fig. 2. This reservoir communicates, by a passage 25, with a hole 19 in the hub 14 and the reservoir 24 communicates, in turn, through one or more passages 26, with the space between the wheel and the sleeve 5 and there is a hole 27 which allows the lubricant to pass into the space between the sleeve and the pin 4, so that, in this case, the bearing of the pin in the sleeve is lubricated and the bearing between the sleeve and the wheel is also lubricated. The particular location of the holes in the wheels will vary according to the type of wheel used in the conveyer.

The lubricator can be placed at any position in the run, either on the carrying run or on the return run of the conveyer, and is preferably located below the run, as illustrated in Fig. 1, but it may be mounted above the run as illustrated in Fig. 4, or at the side of the run, as illustrated in Fig. 5, where it is not practical to place the device between the runs of a chain or above or below them.

In Fig. 5, I have illustrated a construction in which there are two chains spaced apart and there is an automatic oiler in each chain.

In Fig. 6, I have shown the lubricant adapted to lubricate the bearings of the rollers, which are mounted on a vertical axis instead of a horizontal axis, the lubricator coming in contact with openings in the pivot pins of the rollers.

It will be seen that the lubricating device can be located at any point desired so that the passages in the arms of the lubricator are in alinement with the holes in the wheels or bearings to be lubricated. By this means, lubricant under pressure can be discharged into a reservoir in a wheel or into the bearings, according to the construction of the wheels.

Where the lubricator is located above the run of the chains instead of below, the lubricant may flow by gravity into the lubricating openings in the rollers of the chain, but I prefer to use pressure, thus insuring perfect lubrication.

The lubricator may be vertically adjustable to accommodate wheels having bulbs of different diameters.

I claim:—

1. The combination of a chain having lubricating openings at intervals; a rotating lubricator arranged to engage the chain at the openings; a rigid bearing for the lubricator, the said lubricator being arranged to move with the chain during a portion of its travel and to allow lubricant to pass from the lubricator into the openings in the chain.

2. The combination of a chain having lubricating openings at intervals; a rigid support; a rotating lubricator mounted on the support and having a series of seats and having passages in the seats, said seats being arranged to engage the chain at the openings so that the passages will communicate with the openings in the chain to allow lubricant to enter said openings from the lubricator, the chain being deflected during the time the lubricant is applied.

3. The combination of a chain having a series of wheels thereon, each wheel having a lubricating hole therein; a rotating lubricator having curved seats arranged to fit the wheels and having a passage alining with the holes in the wheels so that as the chain moves forward it will carry the lubricator with it and during this movement the lubricant will flow from the lubricator into the hole in each wheel.

4. The combination in means for lubricating wheels of chains, of a track; a chain having wheels arranged to travel on the track, each wheel having a lubricating opening and a lug; a flexible plate arranged close to the track so that, when the wheel reaches the plate, the lug on the wheel will engage the plate and will prevent the wheel turning and will bring the hole in the proper position; and a lubricator having a seat arranged to engage the wheel and having a passage therein alining with the opening to allow lubricant to enter the wheel.

5. The combination in means for lubricating wheels of chains, of a track; a chain of which is interrupted; a rotating lubricator arranged to travel in the interrupted portion of the rail; a chain having wheels arranged to travel on the rail, each wheel having a lubricating opening, the lubricator having a seat to receive the wheel so that it is carried over the interrupted portion of the rail, the seat having an opening therein alining with the hole in the wheel so that lubricant will pass from the lubricator into the wheel.

6. The combination in a lubricator for the wheels of chains, consisting of a hollow shaft having a slot therein; a hub; a series of hollow arms projecting from the hub; seats on the ends of the arms, the hub and each seat having passages therein communicating with the hollow arms, the parts being so arranged that, when the wheels of a chain are mounted on the seats, these particular arms will communicate through the slot with the hollow shaft so that lubricant, under pressure, can be forced through the arms and seat and into the holes in the chain.

JAMES M. DODGE.